(12) United States Patent
Na et al.

(10) Patent No.: US 10,405,321 B2
(45) Date of Patent: Sep. 3, 2019

(54) CELL CONTROL DEVICE AND OPERATION METHOD THEREFOR

(71) Applicant: SK TELECOM CO., LTD., Seoul (KR)

(72) Inventors: Min Soo Na, Seoul (KR); Young Lak Kim, Seoul (KR); Tak Ki Yu, Seoul (KR); Sung Ho Moon, Seoul (KR); Dae Sik Hong, Seoul (KR); Han Ho Wang, Seongnam-si (KR); Kwon Jong Lee, Seoul (KR)

(73) Assignee: SK TELECOM CO., LTD., Seoul (KR)

(*) Notice: Subject to any disclaimer, the term of this patent is extended or adjusted under 35 U.S.C. 154(b) by 77 days.

(21) Appl. No.: 15/529,610

(22) PCT Filed: Jul. 28, 2015

(86) PCT No.: PCT/KR2015/007877
§ 371 (c)(1),
(2) Date: May 25, 2017

(87) PCT Pub. No.: WO2016/088978
PCT Pub. Date: Jun. 9, 2016

(65) Prior Publication Data
US 2017/0265203 A1 Sep. 14, 2017

(30) Foreign Application Priority Data
Dec. 4, 2014 (KR) .......................... 10-2014-0172842

(51) Int. Cl.
*H04W 72/08* (2009.01)
*H04L 5/00* (2006.01)
(Continued)

(52) U.S. Cl.
CPC ......... *H04W 72/082* (2013.01); *H04L 5/0032* (2013.01); *H04L 5/0073* (2013.01);
(Continued)

(58) Field of Classification Search
CPC ............... H04W 72/082; H04W 16/10; H04W 36/0072; H04W 36/20; H04W 36/32;
(Continued)

(56) References Cited

U.S. PATENT DOCUMENTS 6,112,080 A * 8/2000 Anderson ............. G10L 19/012
455/422.1
2014/0126501 A1 5/2014 Pan et al.
(Continued)

FOREIGN PATENT DOCUMENTS

JP 2014175795 A 9/2014
WO 2013170220 A2 11/2013
WO 2014043863 A1 3/2014

OTHER PUBLICATIONS

International Search Report for PCT/KR2015/007877 dated Nov. 6, 2015.

*Primary Examiner* — Duc C Ho
(74) *Attorney, Agent, or Firm* — Hauptman Ham, LLP (57) ABSTRACT

A cell control device achieves optimal interference control taking into account a different between the DL interference strength and the UL interference strength by an adjacent cell by way of controlling cells based on D-TDD in a network environment where a number of cells employing TDD coexist. A method of operating a cell control device is also disclosed.

13 Claims, 4 Drawing Sheets

(51) Int. Cl.
  *H04L 5/14*   (2006.01)
  *H04W 36/00*  (2009.01)
  *H04W 36/20*  (2009.01)
  *H04W 36/22*  (2009.01)
  *H04W 72/04*  (2009.01)
  *H04W 16/10*  (2009.01)

(52) U.S. Cl.
  CPC .......... *H04L 5/1461* (2013.01); *H04L 5/1469* (2013.01); *H04W 16/10* (2013.01); *H04W 36/0072* (2013.01); *H04W 36/20* (2013.01); *H04W 36/22* (2013.01); *H04W 72/0486* (2013.01); *H04L 5/0035* (2013.01); *H04W 72/0446* (2013.01); *H04W 72/0453* (2013.01)

(58) Field of Classification Search
  CPC ......... H04W 72/0486; H04W 72/0446; H04W 72/0453; H04L 5/0032; H04L 5/0073; H04L 5/1461; H04L 5/1469; H04L 5/0035
  See application file for complete search history.

(56) References Cited

U.S. PATENT DOCUMENTS

| | | |
|---|---|---|
| 2014/0204765 A1 | 7/2014 | Chai et al. |
| 2014/0269456 A1* | 9/2014 | Wang .................. H04B 7/2656 370/280 |

* cited by examiner

CELL CONTROL DEVICE AND OPERATION METHOD THEREFOR

CROSS REFERENCE TO RELATED APPLICATION

This application is the National Phase application of International Application No. PCT/KR2015/007877, filed on Jul. 28, 2015, which is based upon and claims the benefit of priority under 35 U.S.C § 119(a) of Korean Patent Application No. 10-2014-0172842, filed on Dec. 4, 2014, with the Korean Intellectual Property Office (KIPO), the entire contents of which are incorporated herein by reference.

TECHNICAL FIELD

The present disclosure relates to a cell control device capable of achieving optimal interference control taking into account a different between the DL interference strength and the UL interference strength caused by an adjacent cell by way of controlling cells based on D-TDD in a network environment where a number of cells employing TDD coexist, and a method of operating a cell control device.

BACKGROUND ART

Mobile communications systems employ duplex technology to provide downlink (DL) and uplink (UL) service. The duplex technology may be largely divided into frequency division duplexing (FDD) and time division duplexing (TDD).

In FDD, frequency band allocated for DL transmission and frequency band allocated for UL transmission are fixed. As the utilization of the frequency band is not variable, it is difficult to efficiently respond to increased DL traffic.

In TDD, on the other hand, the same frequency band may be variably allocated to the downlink (DL) transmission or the uplink (UL) transmission depending on time intervals. A frame may be divided into sub-frames, and each of the sub-frames may be allocated for DL or UL transmission.

Such TDD can change the utilization of the same frequency band depending on time intervals and is evolving toward dynamic TDD (D-TDD) that allows for adaptively responding to DL/UL traffic by way of increasing the number of sub-frames in a frame that are allocated for DL transmission (hereinafter referred to as DL sub-frames) when the amount of DL traffic increases instantaneously while decreasing the number of sub-frames that are allocated for UL transmission (hereinafter referred to as UL sub-frames) according to the number of increased DL sub-frames, for example.

Recently, mobile communications systems install various types of cells such as pico-cells, femtocells and the like and evolve to increase transmission capacity per area by reutilizing frequency. As a result, a number of cells are densely disposed.

As such, in a network environment where a number of cells densely coexist, adjacent cells are very close to one another, and thus interference between adjacent cells becomes strong. In particular, if TDD is employed, there is a difference between the strengths of interference on DL and UL transmissions by an adjacent cells that affect another cell (hereinafter referred to as "DL interference" and "UL interference," respectively). This is because the DL interference occurs when a base station constantly receiving power transmits data and thus is transmitted at higher transmission power than UL transmission.

In view of the above, the exemplary embodiments of the present disclosure propose an approach to achieve optimal interference control taking into account a different between the DL interference strength and the UL interference strength by an adjacent cell by way of controlling cells based on D-TDD in a network environment where a number of cells employing TDD coexist.

DISCLOSURE

Technical Problem

An object of the present disclosure is to provide a cell control device capable of achieving optimal interference control taking into account a different between the DL interference strength and the UL interference strength by an adjacent cell by way of controlling cells based on D-TDD in a network environment where a number of cells employing TDD coexist, and a method of operating a cell control device.

Technical Solution

In accordance with one aspect of the present disclosure, a cell control device includes: an interference detecting unit configured to detect a downlink (DL) interference from each of a plurality of adjacent cells measured at a particular cell; a cell selecting unit configured to select at least one adjacent cell from the plurality of adjacent cells based on at least one of a distance from the particular cell to each of the plurality of adjacent cells and the detected DL interference; and a cell control unit configured to allow, for a frequency band that the particular cell and the at least one adjacent cell use, the at least one adjacent cell to use the frequency band for uplink (UL) transmission at a time point when the particular cell uses the frequency band for DL transmission.

The device may further include: a cell grouping unit configured to sort the plurality of adjacent cells and the particular cell into two or more cell groups based on at least one of the distance from the particular cell to each of the plurality of adjacent cells and the detected DL interference, wherein the cell selecting unit selects the at least one adjacent cell from adjacent cell included in a cell group where the particular cell belongs.

The plurality of adjacent cells and the particular cell may transmit/receive UL or DL signals by using a frame having a structure that includes one or more flexible sub-frame, wherein the flexible sub-frames are flexibly allocated for UL transmission or DL transmission for a same frequency band.

The time point may be a point in time when the at least one adjacent cell use the flexible sub-frames.

The some adjacent cells selected from the plurality of adjacent cells may be closer to the particular cell and has stronger DL interference than the other adjacent cells, and has a ratio between UL and DL traffic amounts below a predetermined threshold ratio.

The particular cell may provide the at least one adjacent cell with a downlink signal transmitted by using the frequency band for DL transmission via a wired or wireless communications network at the time point, such that the at least one adjacent cell use the downlink signal from the particular cell to detect an interference signal when the at least one adjacent cell remove interference from an uplink signal received by using the frequency band for UL transmission at the time point.

In accordance with one aspect of the present disclosure, a method of operating a cell control device includes: detecting a downlink (DL) interference from each of a plurality of adjacent cells measured at a particular cell; selecting at least one adjacent cell from the plurality of adjacent cells based on at least one of a distance from the particular cell to each of the plurality of adjacent cells and the detected DL interference; and allowing, for a frequency band that the particular cell and the at least one adjacent cell use, the at least one adjacent cell to use the frequency band for uplink (UL) transmission at a time point when the particular cell uses the frequency band for DL transmission.

The method may further include: sorting the plurality of adjacent cells and the particular cell into two or more cell groups based on at least one of the distance from the particular cell to each of the plurality of adjacent cells and the detected DL interference, wherein the selecting comprises selecting the at least one adjacent cell from adjacent cell included in a cell group where the particular cell belongs.

The plurality of adjacent cells and the particular cell may transmit/receive UL or DL signals by using a frame having a structure that includes one or more flexible sub-frame, wherein the flexible sub-frames are flexibly allocated for UL transmission or DL transmission for a same frequency band.

The time point may be a point in time when the at least one adjacent cell use the flexible sub-frames.

The some adjacent cells selected from the plurality of adjacent cells may be closer to the particular cell and have stronger DL interference than the other adjacent cells, and has a ratio between UL and DL traffic amounts below a predetermined threshold ratio.

Advantageous Effects

The cell control device and the method of operating the same according to the exemplary embodiment of the present disclosure can achieve optimal interference control in a network environment where a number of cells employing TDD coexist, taking into account a different between the DL interference strength and the UL interference strength by an adjacent cell by way of controlling cells based on D-TDD.

BEST MODE

Hereinafter, an exemplary embodiment of the present disclosure will be described with reference to the accompanying drawings.

Figure 1:
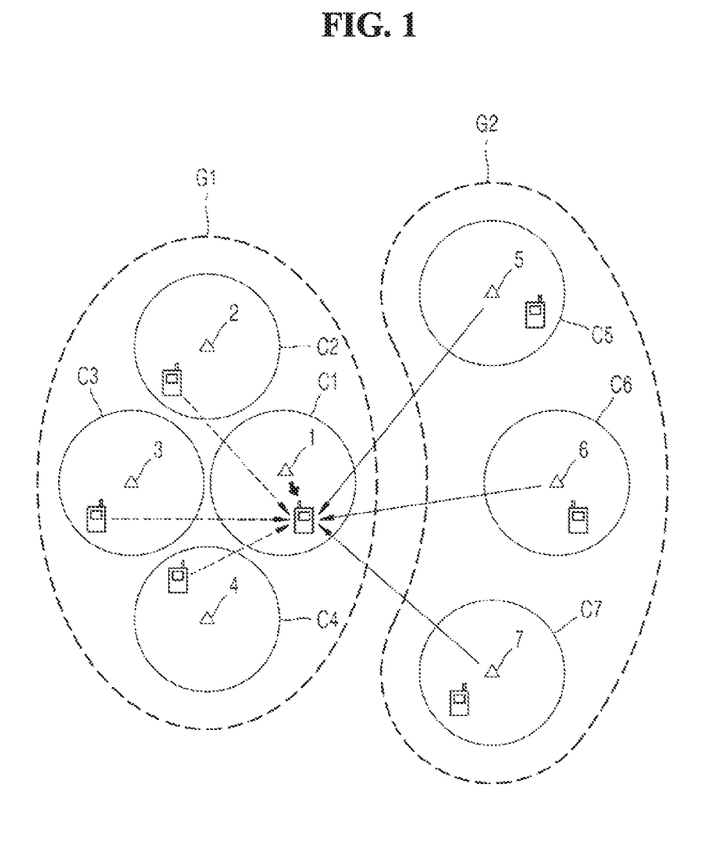
FIG. 1 is a diagram showing a communications system in a network environment where a number of cells coexist, to which an exemplary embodiment of the present disclosure is applied.

FIG. 1 is a diagram showing a communications system to which an exemplary embodiment of the present disclosure is applied, i.e., a communications system in a network environment where a number of cells coexist.

As shown in FIG. 1, in the environment where a number of cells coexist, adjacent cells are very close to one another, and thus inter-cell interference becomes strong.

In particular, various types of small cells such as pico-cells and femtocells are disposed recently, such that the transmission capacity per area is increasing by reusing frequency. As a result, cells are becoming denser and denser.

That is, the cells shown in FIG. 1 may be small cells such as pico-cells, femtocells, etc.

It is to be understood that the cells shown in FIG. 1 may be macro cells or a combination of macro cells and small cells.

In the following description, the cells C1 to C7 shown in FIG. 1 will be described as examples for convenience of illustration.

In addition, it is assumed that each of the cells employs time division duplexing (TDD) in the network environment where a number of cells densely coexist.

In TDD, the same frequency band may be variably allocated to the downlink (DL) transmission or the uplink (UL) transmission depending on time intervals. A frame may be divided into sub-frames, and each of the sub-frames may be allocated for DL or UL transmission.

Such TDD can change the utilization of the same frequency band depending on time intervals and is evolving toward dynamic TDD (D-TDD) that allows for adaptively responding to DL/UL traffic by way of increasing the number of sub-frames in a frame that are allocated for DL transmission (hereinafter referred to as DL sub-frames) when the amount of DL traffic increases instantaneously while decreasing the number of sub-frames that are allocated for UL transmission (hereinafter referred to as UL sub-frames) by the number of increased DL sub-frames, for example.

Accordingly, the cells C1 to C7 shown in FIG. 1, which use the same frequency band F1, may adjust the number of DL sub-frames and the number of UL sub-frames in a frame depending on their DL/UL traffic by D-TDD, thereby adaptively utilizing frequency radio resources for DL/UL traffic.

Accordingly, in the network environment shown in FIG. 1, the influence of interference between adjacent cells varies depending on how they utilize frequency radio resources.

For example, referring to a single cell C1, when an adjacent cell utilizes the frequency radio resources in the same manner with the cell C1 for the frequency band F1, the interference by the DL transmission of the adjacent cell (DL interference) would affect the DL transmission of the cell C1, and the interference by the UL transmission of the adjacent cell (UL interference) would affect the UL transmission of the cell C1.

On the other hand, for an adjacent cell that utilizes frequency radio resource in the opposite manner to the cell C1 for the frequency band F1, the DL interference by the adjacent cell would affect the UL transmission of the cell C1, and the UL interference by the adjacent cell would affect the DL transmission of the cell C1.

In addition, in the network environment shown in FIG. 1, there is a difference between the DL interference strength and the UL interference strength by an adjacent cell that affects a cell.

This is because the DL interference occurs when a base station constantly receiving power transmits data and thus is transmitted at higher transmission power than UL transmission.

Accordingly, a terminal 10 located in the cell C1 is greatly affected by the DL interference of an adjacent cell that utilizes frequency radio resource in the same manner as the cell C1 and thus undergoes serious cell capacity reduction.

In view of the above, it has been appreciated that the influence of the interference in the network environment where a number of cells C1 to C7 employing TDD densely coexist as shown in FIG. 1 can be changed by adjusting frequency radio resource utilization of each of the cells, and that there is a difference between the DL interference strength and the UL interference strength by an adjacent cell. Accordingly, exemplary embodiments of the present disclosure propose an approach to achieve optimal interference control taking into account a different between the DL interference strength and the UL interference strength by an adjacent cell by way of controlling cells based on D-TDD.

More specifically, exemplary embodiments of the present disclosure propose a cell control device capable of achieving optimal interference control taking into account a different between the DL interference strength and the UL interference strength by an adjacent cell by way of controlling cells based on D-TDD in a network environment as shown in FIG. 1.

Figure 2:
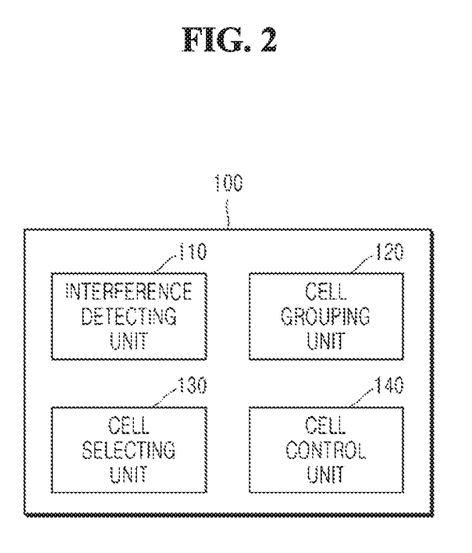
FIG. 2 is a block diagram of a cell control device according to an exemplary embodiment of the present disclosure.

Hereinafter, a cell control device according to an exemplary embodiment of the present disclosure will be described in detail with reference to FIG. 2.

A cell control device 100 according to the exemplary embodiment of the present disclosure includes: an interference detecting unit 110 that detects DL interference from each of a plurality of adjacent cells measured at a particular cell; a cell selecting unit 130 that selects at least one adjacent cell from among the plurality of adjacent cells based on a distance from the particular cell to each of the plurality of adjacent cells and/or the detected DL interference; and a cell control unit 140 that allows a frequency band that the particular cell and the at least one adjacent cell use in the same manner to be utilized for UL transmission in the at least one adjacent cell at a time point when the particular cell utilizes the frequency band for DL transmission.

Herein, the particular cell refers to a target cell that is a reference for the cell control function performed by the cell control device 100 according to the exemplary embodiment of the present disclosure.

In the following description, among the cells C1 to C7 shown in FIG. 1, the cell C1 will be described as the reference for convenience of illustration.

The interference detecting unit 110 detects downlink (DL) interference from each of the plurality of adjacent cells measured at a particular cell, i.e., the cell C1.

For example, at the cell C1, DL interference from each of the adjacent cells may be measured.

The DL interference may be measured by using a pilot signal having a unique pattern for each of the cells. There are many ways to measure the interference. For example, one of the cells C1 to C7, e.g., the cell C1 may transmit a pilot signal and the other cells may receive it, then the other cells C2 to C7 may measure the interference in the pilot signal (DL) from the cell C1.

In this manner, the interference detecting unit 110 may detect the DL interference from each of the plurality of adjacent cells measured at the cell C1.

The plurality of adjacent cells may refer to the cells C2 to C7 other than the cell C1.

The cell selecting unit 130 may select at least one adjacent cell from among the plurality of adjacent cells C2 to C7 based on the distance from the cell C1 to each of the adjacent cells C2 to C7 and/or the DL interference detected by the interference detecting unit 110.

Before describing the cell selecting unit 130 in detail, the cell control device 100 according to the exemplary embodiment of the present disclosure may further include a cell grouping unit 120.

The cell grouping unit 120 may sort the plurality of adjacent cells C2 to C7 and the cell C1 into two or more cell groups based on the distance from the cell C1 to each of the adjacent cells C2 to C7 and/or the DL interference detected by the interference detecting unit 110.

More specifically, based on the distance from the cell C1 to each of the plurality of adjacent cells C2 to C7, the cell grouping unit 120 may define some of the adjacent cells C2 to C7 that are within a predetermined threshold distance from the cell C1 as the same cell group with the cell C1, and may define the other cells that are out of the predetermined threshold distance from the cell C1 as another cell group.

Alternatively, based on the DL interference detected by the interference detecting unit 110, the cell grouping unit 120 may define adjacent cells having the DL interference measured at the cell C1 above a predetermined threshold interference as the same cell group with the cell C1 while it may define the other adjacent cells having the DL interference measured at the cell C1 below the predetermined threshold interference as another cell group.

Alternatively, based both on the distance from the cell C1 to each of the adjacent cells C2 to C7 and the DL interference detected by the interference detecting unit 110, the cell grouping unit 120 may define some of the adjacent cells C2 to C7 that are within the predetermined threshold distance from the cell C1 and have the DL interference measured at the cell C1 above the predetermined threshold interference as the same cell group with the cell C1, and may define the other cells as another cell group.

In the following description, it is assumed that the cell grouping unit 120 defines the cells C1 to C4 as belonging to a cell group G1 and the cells C5 to C7 as belonging to a cell group G2, as shown in FIG. 1 for convenience of illustration.

In the exemplary embodiment where the cell control device 100 includes the cell grouping unit 120, the cell selecting unit 130 may select the at least one adjacent cell only from among the adjacent cells C2 to C4 belonging to the cell group G1 where the cell C1 belongs between the two or more cell groups G1 and G2.

In the exemplary embodiment where the cell control device 100 does not include the cell grouping unit 120, on the other hand, the cell selecting unit 130 may select at least one adjacent cell that are closer to the cell C1 and have stronger DL interference than the other adjacent cells at first from among the plurality of adjacent cells C2 to C7, based on the distance from the cell C1 to each of the adjacent cells C2 to C7 and/or the DL interference detected by the interference detecting unit 110.

Then, the cell selecting unit 130 may select the at least one adjacent cell only from among the adjacent cells C2 to C4 selected at first as described above.

In the network environment as shown in FIG. 1, the adjacent cells selected at first by the cell selecting unit 130 may be similar to the adjacent cells C2 to C4 in the cell group G1 where the cell C1 belongs according to the above-described exemplary embodiment.

According to the above-described exemplary embodiment where the cell groups G1 and G2 are defined in advance, however, the cells in the respective cell groups do not change unless the layout of the cells is changed, and thus the process of selecting the at least one adjacent cell finally by the cell selecting unit 130 can be simpler and the time taken to select them can be saved.

In the network environment where a number of cells C1 to C7 densely coexist as shown in FIG. 1, an adjacent cell closer to the cell C1 is likely to have stronger DL interference measured at the cell C1 among the plurality of adjacent cells C2 to C7. In this perspective, it may be considered that an adjacent cell having a stronger DL interference measured at the cell C1 is closer to the cell C1.

That is, according to the exemplary embodiment of the present disclosure, from the perspective of the cell C1 that is the reference of the cell control function performed by the cell control device 100, the at least one adjacent cell are selected only from among the adjacent cells that are closer to the cell C1 and have stronger DL interference than the other adjacent cells.

Hereinafter, a process of selecting the at least one adjacent cell from among the adjacent cells C2 to C4 selected by the cell selecting unit 130 at first as described above or the adjacent cells C2 to C4 in the cell group G1 where the cell C1 belongs will be described in detail.

It is to be understood that the cell selecting unit 130 may select all cells of the adjacent cells C2 to C4 firstly selected as described above or the adjacent cells C2 to C4 in the cell group G1 where the cell C1 belongs as the at least one adjacent cell.

It is to be noted that the cell control unit 140 to be described below, which controls the at least one adjacent cell selected by the cell selecting unit 130 for control the interference affecting the particular cell, i.e., the cell C1, should not ignore the frequency radio resource utilization performed by the adjacent cells themselves based on D-TDD.

Accordingly, it is desirable to select the at least one adjacent cell from among the adjacent cells C2 to C4 selected at first as described above or the adjacent cells C2 to C4 in the cell group G1 where the cell C1 belong, taking into account the frequency radio resource utilization performed by the adjacent cells C2 to C4 themselves based on D-TDD.

More specifically, as described above, it is assumed that the plurality of cells C1 to C7 shown in FIG. 1, i.e., the plurality of adjacent cells C2 to C7 and the cell C1 employ TDD.

Figure 3:
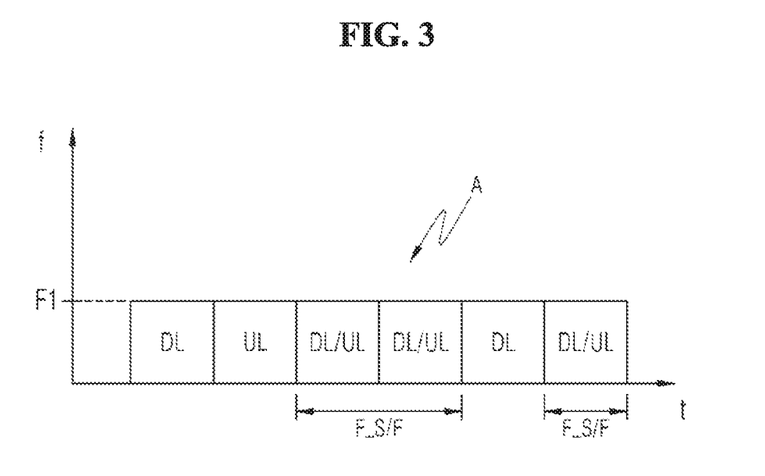
FIG. 3 is a view showing a frame structure used by a cell according to an exemplary embodiment of the present disclosure.

Accordingly, the plurality of adjacent cells C2 to C7 and the cell C1, as shown in FIG. 3, for example, may utilize sub-frames of a frame A to be allocated for DL and UL transmissions, and may even utilize the frequency radio resource adaptively to DL/UL traffics by D-TDD.

That is, the plurality of adjacent cells C2 to C7 and the cell C1 transmit/receive UL/DL signals by using a frame including one or more flexible sub-frames, which can be used flexibly for UL transmission or DL transmission for the same frequency band.

Referring to FIG. 3, a frame A used for the plurality of adjacent cells C2 to C7 and the cell C1 may include at least one DL sub-frame fixedly allocated for DL transmission and at least one UL sub-frame fixedly allocated for UL transmission for the same frequency bandwidth F1, and at least one flexible sub-frame (F_S/F) flexibly allocated for DL or UL transmissions for the same frequency band F1 (e.g., two DL sub-frames, one UL sub-frame, and three flexible sub-frames).

It is to be understood that the frame structure shown in FIG. 3 is merely an example. For example, all of the sub-frames in the frame may be flexible sub-frames (F_S/F).

In the following description, the frame A having the structure shown in FIG. 3 will be described in detail for convenience of illustration.

Each of the plurality of adjacent cells C2 to C7 and the cell C1 utilizes frequency radio resources adaptively to DL/UL traffic by way of allocating more flexible sub-frames F_S/F to DL transmission to increase the number of the DL sub-frames and decreasing the number of UL sub-frames to adjust the numbers of the DL sub-frames and the number of the UL sub-frames in the frame A when the amount of DL traffic is increased instantaneously according to DL/UL traffic taken in the cell.

If the adjacent cells selected at first by the cell selecting unit 130 or the adjacent cells in the cell group G1 where the cell C1 belongs are C2 to C4 as described above, the cell selecting unit 130 preferably selects adjacent cells having a ratio of the amount of traffic between UL and DL transmissions below a predetermined threshold ratio from among the adjacent cells C2 to C4 as the at least one adjacent cell finally.

That is, the cell selecting unit 130 selects some of the adjacent cells C2 to C4 having a ratio between UL and DL traffic amounts below a threshold ratio as the at least one adjacent cell finally. For example, the adjacent cells that do not require all of the flexible sub-frames F_S/F in the frame A to be used for DL transmission in utilizing frequency radio resource by D-TDD is selected as the at least one adjacent cell.

In the following description, it is assumed that all of the adjacent cells C2 to C4 have the ratio below the threshold ratio for convenience of illustration.

In this case, the cell selecting unit 130 would select the adjacent cells C2 to C4 as the at least one adjacent cell finally.

For a frequency band that the cell C1 and the at least one adjacent cell C2 to C4 selected by the cell selecting unit 130 use in the same manner, the cell control unit 140 allows the at least one adjacent cell C2 to C4 to use the frequency band for UL transmission at a time point when the cell C1 uses the frequency band for DL transmission.

That is, as described above, for the frequency band F1 that the cell C1 and the at least one adjacent cell C2 to C4 use in the same manner, the cell control unit 140 controls the at least one adjacent cell C2 to C4 so that the at least one adjacent cell C2 to C4 use UL sub-frames for the frequency band F1 at the time point when the cell C1 uses DL sub-frames for the frequency band F1.

Herein, the time point may refer to a point in time when the at least one adjacent cell C2 to C4 use flexible sub-frames F_S/F.

In addition, the cell control unit 140 may control the at least one adjacent cell C2 to C4 in a variety of manners.

For example, the cell control device 100 according to the exemplary embodiment of the present disclosure may be an independent base station that operates cells. In the above-described exemplary embodiment of the present disclosure where the cell C1 is the particular cell that is the reference of the cell control function performed by the cell control device 100 according to the exemplary embodiment of the present disclosure, the base station 1 operating the cell C1 may be the cell control device 100.

In this case, the cell control device 100 may transmit the configuration information of the frame A being used by the cell C1, a cell control request or the like to the at least one adjacent cell C2 to C4 via a wired/wireless communications network, such that it may indirectly control the adjacent cells C2 to C4 so that they use UL sub-frames at the time point when the cell C1 uses a DL sub-frame according to the received information and the request.

Alternatively, the cell control device 100 may be an additional device that centrally manages the cells C1 to C7 or may be a base station module BU of each of separated base stations forming the cells C1 to C7, which controls a radio module RU of the respective base stations.

In this case, the cell control device 100 may directly control RU 2, 3 and 4 of the at least one adjacent cell C2 to C4 so that they use UL sub-frames at the time point when the cell C1 uses a DL sub-frame.

Accordingly, as shown in FIG. 1, according to the cell control function by the cell control device 100, the adjacent cells C2 to C4 that are likely to cause serious DL interference on the DL transmission of the cell C1 use the frequency band F1 for UL transmission at the time point when the cell C1 uses the frequency band F1 for DL transmission, and thus a possible DL interference by the adjacent cells C2 to C4 is changed to a possible UL interference, which is less serious than the DL interference. As a result, the terminal 10 using DL service in the cell C1 can avoid DL interference by the adjacent cells C2 to C4.

Incidentally, as the adjacent cells C2 to C4 use the frequency band F1 for UL transmission at the time point when the cell C1 uses the frequency band F1 for DL transmission according to the cell control function by the cell control device 100, UL transmission of the adjacent cells C2 to C4 may be likely to be seriously affected by the DL interference by the cell C1.

Accordingly, it is necessary to remove interference signals (DL interference by the cell C1) efficiently from UL transmission of the adjacent cells C2 to C4.

To this end, according to an exemplary embodiment of the present disclosure, a particular cell, i.e., the cell C1 provides at least one adjacent cell, i.e., the adjacent cells C2 to C4 with a downlink signal transmitted by using the frequency band F1 for DL transmission at a certain time point via a wired/wireless communications network.

Accordingly, the adjacent cells C2 to C4 can detect an interference signal by using the DL signal provided from the cell C1 when they remove the interference signal from an UL signal received by using the frequency band F1 for UL transmission at the time point.

More specifically, typical cells including the cell C1 and the adjacent cells C2 to C4 use a technique to detect an interference signal from an UL signal and remove the detected interference signal. In the above-described technique, how to detect an interference signal and how to remove the detected interference signal from an UL signal are well known in the art; and, therefore, detailed description thereon will not be made.

Accordingly, each of the adjacent cells C2 to C3 also would detect an interference signal from an UL signal received by using the frequency band F1 for UL transmission at the time point and remove the detected interference signal.

In doing so, according to an exemplary embodiment of the present disclosure, as the cell C1 provides the adjacent cells C2 to C4 with a downlink signal, the adjacent cells C2 to C4 use the downlink signal in place of a detected interference signal when they remove interference from an uplink signal received by using the frequency band F1 for UL transmission at the time point, thereby removing an interference signal (i.e., the downlink signal from the cell C1) from the uplink signal.

Accordingly, even if the adjacent cells C2 to C4 use the frequency band F1 for UL transmission at the time point when the cell C1 uses the frequency band F1 for DL transmission, the DL interference by the cell C1 can be accurately and quickly removed from UL transmission of the adjacent cells C2 to C4 according to the cell control function by the cell control device 100 as described above.

As described above, according to an exemplary embodiment of the present disclosure, in a network environment where a number of cells employing TDD densely coexist, a cell control device performs cell control function based on D-TDD such that adjacent cells, which are likely to affect serious DL interference on a DL transmission of a particular cell, use a frequency band for UL transmission at a time point when the particular cell uses the frequency band for DL transmission, taking into account that the influence of the interference can be changed by adjusting the utilization of frequency radio resources of each of the cells, and that there is a difference between the DL interference strength and the UL interference strength by an adjacent cell.

Consequently, the cell control device according to the exemplary embodiment of the present disclosure can achieve optimal interference control in a network environment where a number of cells employing TDD coexist, taking into account a different between the DL interference strength and the UL interference strength by an adjacent cell by way of controlling cells based on D-TDD.

Figure 4:
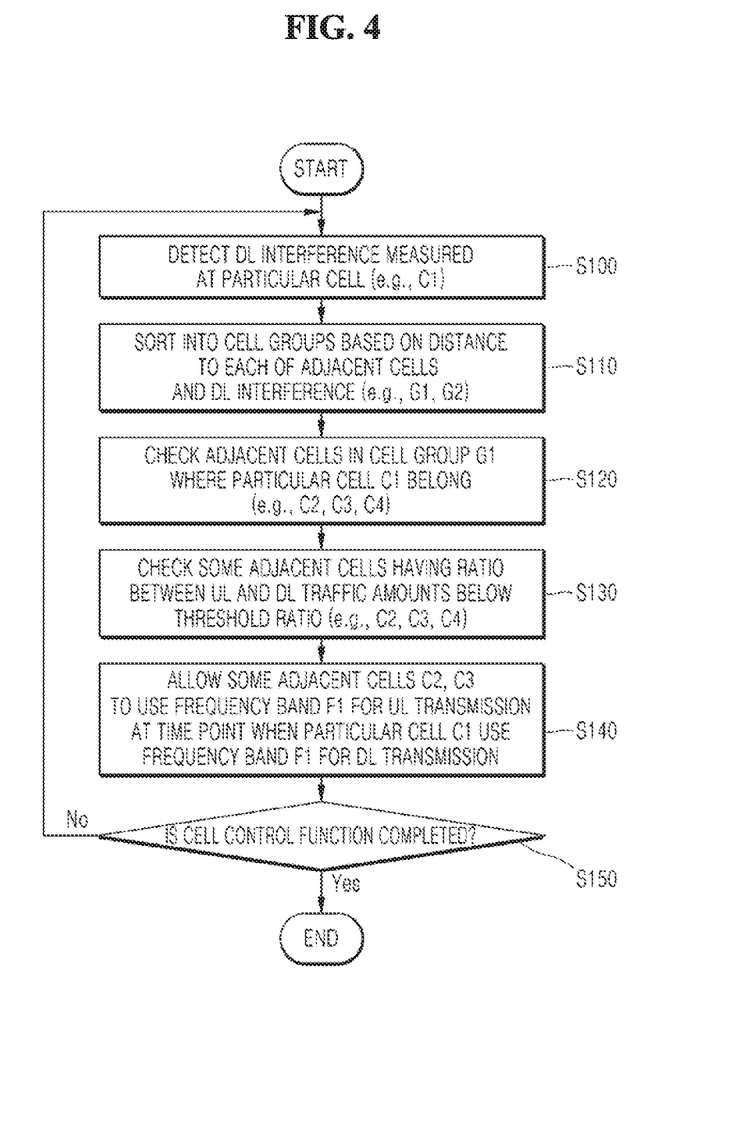
FIG. 4 is a flow chart illustrating a method of operating a cell control device according to an exemplary embodiment of the present disclosure.

Hereinafter, a method of operating a cell control device according to an embodiment of the present disclosure will be described in detail with reference to FIG. 4. For convenience of illustration, the same reference numerals as those of FIGS. 1 to 3 are used in the following description.

The method of operating the cell control device 100 according to the exemplary embodiment of the present disclosure includes detecting DL interference from each of a plurality of adjacent cells measured at a particular cell, i.e., a cell C1 (step S100).

For example, at the cell C1, DL interference from each of the adjacent cells may be measured.

To measure the DL interference, a pilot signal having a unique pattern for each of the cells may be used. There are many ways to measure the interference. For example, one of the cells C1 to C7, e.g., the cell C1 may transmit a pilot signal and the other cells may receive it, then the other cells C2 to C7 may measure the interference in the pilot signal (DL) from the cell C1.

As a result, the DL interference can be detected from each of a plurality of adjacent cells measured at the cell C1.

The plurality of adjacent cells may refer to the cells C2 to C7 other than the cell C1.

Subsequently, the method includes sorting the plurality of adjacent cells C2 to C7 and the cell C1 into two or more cell groups based on the distance from the cell C1 to each of the plurality of adjacent cells C2 to C7 and/or the downlink (DL) interference detected in step S100 (step S110).

More specifically, based on the distance from the cell C1 to each of the adjacent cells C2 to C7, some of the adjacent cells C2 to C7 that are within a predetermined threshold distance from the cell C1 may be defined as the same cell group with the cell C1, and the other cells that are out of the predetermined threshold distance from the cell C1 may be defined as another cell group.

Alternatively, based on the DL interference detected by the interference detecting unit 110 in step S100, adjacent cells having the DL interference measured at the cell C1 above a predetermined threshold interference may be defined as the same cell group with the cell C1 while the other adjacent cells having the DL interference measured at the cell C1 below the predetermined threshold interference may be defined as another cell group.

Alternatively, based both on the distance from the cell C1 to each of the plurality of adjacent cells C2 to C7 and the DL interference detected by the interference detecting unit 110 in step S100, some of the adjacent cells C2 to C7 that are within a predetermined threshold distance from the cell C1 and have the DL interference measured at the cell C1 above the predetermined threshold interference may be defined as the same cell group with the cell C1, and the other cells may be defined as another cell group.

In the following description, it is assumed that the cells C1 to C4 are defined as belonging to a cell group G1 and the cells C5 to C7 are defined as belonging to a cell group G2, as shown in FIG. 1 for convenience of illustration.

Subsequently, the method may include checking adjacent cells C2 to C4 belonging to the cell group G1 where the cell C1 belonging among previously defined two or more cell groups G1 and G2 (step S120).

Eventually, the adjacent cells C2 to C4 belonging to the cell group G1 where the cell C1 belongs would be likely to seriously affect the DL transmission of the cell C1 by DL interference.

Then, the method may include selecting at least one adjacent cell from among the adjacent cells C2 to C4 checked in step S120.

More specifically, the method may include finally selecting some of the adjacent cells C2 to C4 checked in step S120 that have a ratio between UL and DL traffic amount below a predetermined threshold ratio as the at least one adjacent cell (step S130).

That is, the adjacent cells having the ratio between UL and DL traffic amounts below the threshold ratio are finally selected from among the adjacent cells C2 to C4, i.e., the adjacent cells that do not require all of the flexible sub-frames F_S/F in the frame A to be used for DL transmission in utilizing frequency radio resource by D-TDD as the at least one adjacent cell.

In the following description, it is assumed that all of the adjacent cells C2 to C4 have the ratio between UL and DL traffic amounts below the threshold ratio for convenience of illustration.

In this case, the adjacent cells C2 to C4 would be finally selected as the at least one adjacent cell in step S130.

Subsequently, the method includes allowing the at least one adjacent cell C2 to C4 to use a frequency band for UL transmission at a time point when the cell C1 uses the frequency band for DL transmission for the frequency band that the cell C1 and the at least one adjacent cell C2 to C4 selected in step S130 use in the same manner (step S140).

That is, as described above, for the frequency band F1 that the cell C1 and the at least one adjacent cell C2 to C4 use in the same manner, the method controls the at least one adjacent cell C2 to C4 such that the at least one adjacent cell C2 to C4 use UL sub-frames at the time point when the cell C1 uses DL sub-frames.

Herein, the time point may refer to a point in time when the at least one adjacent cell C2 to C4 use flexible sub-frames F_S/F.

Accordingly, as shown in FIG. 1, according to the cell control function by the cell control device 100, the adjacent cells C2 to C4 that are likely to cause serious DL interference on the DL transmission of the cell C1 use the frequency band F1 for UL transmission at the time point when the cell C1 uses the frequency band F1 for DL transmission, and thus a possible DL interference by the adjacent cells C2 to C4 is changed to a possible UL interference, which is less serious than the DL interference. As a result, the terminal 10 using DL service in the cell C1 can avoid DL interference by the adjacent cells C2 to C4.

Subsequently, the method includes determining whether the cell control function is completed (step S150). If it is determined that the cell control function is not completed (No in step S150), it may return to step S100 to repeat processes thereafter with another cell, e.g., the cell C2 as the particular cell.

As described above, the method of operating a cell control device according to the exemplary embodiment of the present disclosure can achieve optimal interference control in a network environment where a number of cells employing TDD coexist, taking into account a different between the DL interference strength and the UL interference strength by an adjacent cell by way of controlling cells based on D-TDD.

The method of operating a cell control device according to an exemplary embodiment of the present disclosure may be implemented as program instructions that may be executed by a various types of computers and may be stored in a computer-readable medium. The computer-readable medium may include program instructions, data files, data structure or the like alone or a combination thereof. The program instructions stored on the medium may be ones specially configured for the present disclosure or any ones well known and available to those skilled in the field of computer software. Examples of the computer-readable storage medium may include magnetic media such as a hard disk, a floppy disk and a magnetic tape; optical media such as a CD-ROM and a DVD; magneto-optical media such as a floppy disk; and hardware devices specially configured to store and execute program instructions, such as a ROM, a RAM, a flash memory or the like. Examples of the program instructions may include machine language codes such as ones being made by compilers as well as high-level language codes capable of being executed by computers using interpreters or the like. The hardware devices may be configured to be operated as one or more software modules to perform operations according to the exemplary embodiments of the present disclosure, or vise versa.

Although the exemplary embodiments of the present disclosure have been described for illustrative purposes, those skilled in the art will appreciate that various modifications, additions and substitutions are possible without departing from the scope and spirit of the present disclosure as defined by the appended claims. Such modifications, additions and substitutions are also construed as falling within the scope of the present disclosure.

The invention claimed is:

1. A cell control device comprising:
an interference detecting unit configured to detect a downlink (DL) interference from each of a plurality of adjacent cells measured at a particular cell;
a cell selecting unit configured to select at least one adjacent cell from the plurality of adjacent cells based on either or both of
a distance from the particular cell to each of the plurality of adjacent cells, and
the detected DL interference; and
a cell control unit configured to allow, for a frequency band that the particular cell and the selected at least one adjacent cell use, the selected at least one adjacent cell to use the frequency band for uplink (UL) transmission at a time point when the particular cell uses the frequency band for DL transmission.

2. The device of claim 1, further comprising:
a cell grouping unit configured to sort the plurality of adjacent cells and the particular cell into two or more cell groups based on either or both of
the distance from the particular cell to each of the plurality of adjacent cells and
the detected DL interference,
wherein the cell selecting unit selects the at least one adjacent cell from adjacent cell included in a cell group where the particular cell belongs.

3. The device of claim 2, wherein the at least one adjacent cell selected from the plurality of adjacent cells belong to the cell group where the particular cell belongs, and has a ratio between UL and DL traffic amounts below a predetermined threshold ratio.

4. The device of claim 1, wherein the plurality of adjacent cells and the particular cell transmit/receive UL or DL signals by using a frame having a structure that includes one or more flexible sub-frame, wherein the flexible sub-frames are flexibly allocated for UL transmission or DL transmission for a same frequency band.

5. The device of claim 4, wherein the time point is a point in time when the at least one adjacent cell use the flexible sub-frames.

6. The device of claim 1, wherein the at least one adjacent cell selected from the plurality of adjacent cells are closer to the particular cell and has stronger DL interference than the other adjacent cells, and has a ratio between UL and DL traffic amounts below a predetermined threshold ratio.

7. The device of claim 1, wherein the particular cell provides the at least one adjacent cell with a downlink signal transmitted by using the frequency band for DL transmission via a wired or wireless communications network at the time point, such that the at least one adjacent cell use the downlink signal from the particular cell to detect an interference signal when the at least one adjacent cell remove interference from an uplink signal received by using the frequency band for UL transmission at the time point.

8. A method of operating a cell control device, the method comprising:
detecting a downlink (DL) interference from each of a plurality of adjacent cells measured at a particular cell;
selecting at least one adjacent cell from the plurality of adjacent cells based on either or both of
a distance from the particular cell to each of the plurality of adjacent cells, and
the detected DL interference; and
allowing, for a frequency band that the particular cell and the selected at least one adjacent cell use, the selected at least one adjacent cell to use the frequency band for uplink (UL) transmission at a time point when the particular cell uses the frequency band for DL transmission.

9. The method of claim 8, further comprising:
sorting the plurality of adjacent cells and the particular cell into two or more cell groups based on at least one of the distance from the particular cell to each of the plurality of adjacent cells and the detected DL interference,
wherein the selecting comprises selecting the at least one adjacent cell from adjacent cell included in a cell group where the particular cell belongs.

10. The method of claim 9, wherein the at least one adjacent cell selected from the plurality of adjacent cells belong to the cell group where the particular cell belongs, and has a ratio between UL and DL traffic amounts below a predetermined threshold ratio.

11. The method of claim 8, wherein the plurality of adjacent cells and the particular cell transmit/receive UL or DL signals by using a frame having a structure that includes one or more flexible sub-frame, wherein the flexible sub-frames are flexibly allocated for UL transmission or DL transmission for a same frequency band.

12. The method of claim 11, wherein the time point is a point in time when the at least one adjacent cell use the flexible sub-frames.

13. The method of claim 8, wherein the at least one adjacent cell selected from the plurality of adjacent cells are closer to the particular cell and have stronger DL interference than the other adjacent cells, and has a ratio between UL and DL traffic amounts below a predetermined threshold ratio.

* * * * *